(12) United States Patent
Helmer et al.

(10) Patent No.: US 6,262,169 B1
(45) Date of Patent: *Jul. 17, 2001

(54) PROTONATED AMINES FOR CONTROLLED CROSSLINKING OF LATEX POLYMERS

(75) Inventors: Bradley James Helmer, Kingsport; David Logan Murray, Fall Branch; Charles Howard Foster, Kingsport, all of TN (US)

(73) Assignee: Eastman Chemical Company, Kingsport, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,924

(22) Filed: May 14, 1998

(51) Int. Cl.⁷ ....................................................... C08L 39/00
(52) U.S. Cl. ........................................... 524/555; 524/558
(58) Field of Search ..................................... 524/555, 558

(56) References Cited

U.S. PATENT DOCUMENTS

| | | |
|---|---|---|
| 4,772,680 | 9/1988 | Noomen et al. . |
| 5,451,653 | 9/1995 | Chen et al. . |
| 5,498,659 | 3/1996 | Esser . |

FOREIGN PATENT DOCUMENTS

| | | |
|---|---|---|
| 0271033 A2 | 12/1987 | (EP) . |
| 0 555 774 | 8/1993 | (EP) . |
| 0 744 450 | 11/1996 | (EP) . |
| 0 778 317 | 6/1997 | (EP) . |
| 2 213 157 | 8/1989 | (GB) . |
| 08218026 * | 8/1996 | (JP) . |
| WO 95/09209 | 4/1995 | (WO) . |
| WO 96/16998 | 6/1996 | (WO) . |
| WO 99/14275 A1 | 3/1999 | (WO) . |

OTHER PUBLICATIONS

Elsevier Science S.A., 1996, Progress in Organic Coatings 27 (1996) 73–78, Analytical Aspects and Film Properties of Two-Pack Acetoacetate Functional Latexes, Pieter J. A. Geurink et al.

Patent Abstracts of Japan, Publication No. 08151412, Publication Date Jun. 11, 1996, Application No. 06316035, Application Date Nov. 28, 1994, Inventor: Ueon Gouichi, "Method for Water-Proofing Polyvinyl Alcohol Resin".

Patent Abstracts of Japan, Publication No. 07238203, Publication Date Sep. 12, 1995, Application No. 06056673, Application Date Mar. 1, 1994, Inventor: Tanabiki Fumio, "Aqueous Emulsion Composition and Its Production".

* cited by examiner

Primary Examiner—Ana Woodward
(74) Attorney, Agent, or Firm—Rose M. Allen; Harry J. Gwinnell

(57) ABSTRACT

The latex polymer compositions of the present invention exhibit latent crosslinking properties. Latent crosslinking in the polymers takes advantage of the fast reaction that occurs between amine-reactive carbonyl groups in the polymer component and carbonyl-reactive amine nitrogens in the crosslinking component, but controls the rate of crosslinking by protonating the amines with a volatile acid. Once the latex is coated onto a substrate, the volatile acid evaporates and the carbonyl reactive amine nitrogens react with the amine reactive carbonyl groups to form a crosslinked coating.

15 Claims, No Drawings

PROTONATED AMINES FOR CONTROLLED CROSSLINKING OF LATEX POLYMERS

BACKGROUND OF THE INVENTION

This invention belongs to the field of emulsion chemistry. In particular, it relates to latex polymer compositions containing protonated amines for controlled crosslinking. The latexes are useful in a variety of coating formulations.

In an increasing number of industries, aqueous coating compositions continue to replace traditional organic solvent-based coating compositions. Paints, inks, sealants, and adhesives, for example, previously formulated with organic solvents are now formulated as aqueous compositions. This reduces potentially harmful exposure to volatile organic compounds (VOC's) commonly found in solvent-based compositions. While the move from organic solvent-based to aqueous compositions brings health and safety benefits, the aqueous coating compositions must meet or exceed the performance standards expected from solvent-based compositions. The need to meet or exceed such performance standards places a premium on the characteristics and properties of waterborne polymer compositions used in aqueous coating compositions.

Waterborne polymer having various functional groups have been used to impart and achieve desired properties to a particular coating composition. For example, a coating composition should exhibit good film formation, print and block resistance, as well as adhesion and tensile properties. Polymers having acetoacetyl functional groups represent one example of waterborne polymers which have such properties, may carry different functional groups, and are useful in aqueous coating compositions.

The latex industry has had a long-standing goal to develop effective one-pack crosslinking systems. The ideal system would allow film formation before substantial crosslinking took place. This type chemistry should be unreactive (or very slow to react) in the wet state, but very reactive (at room temperature) in the dry state; referred to hereinafter as latent crosslinking. The result of latent crosslinking would be a good film-forming latex with excellent solvent resistance and hardness.

Several patents have been granted on various one-pack chemistries, including many based on epoxies (glycidyl methacrylate), silanes, isocyanates, and carbonyls (including acetoacetoxy ethyl methacrylate, AAEM). Most of these patents have indicated the presence of crosslinking by demonstrating improved solvent resistance. However, the same results might be expected if the reaction took place in the wet state before film formation, and there is no reason to believe that these systems react through latent crosslinking.

In order to increase the potlife of compositions containing acetoacetate and amine groups it has been proposed to block the amine groups of the polyamine with a ketone or aldehyde to form corresponding ketimine or aldimine compounds prior to mixing with an acetoacetate-functional polymer. Examples of such non-aqueous compositions are disclosed in U.S. Pat. No. 4,772,680. Even though improved stability may be achieved by specific aromatic aldimines, volatile by-products are still formed and the compositions have no application in waterborne coatings and are restricted to coatings using organic solvents as the carrier.

WO 95/09209 describes a crosslinkable coating composition comprising an aqueous film forming dispersion of addition polymer comprising acetoacetate functional groups and an essentially non volatile polyamine having at least two primary amine groups and wherein the mole ratio of acetoacetate to primary amine groups is between 1:4 to 40:1.

EP 555,774 and WO 96/16998 describe the use of carboxylated acetoacetoxyethyl methacrylate latexes mixed with multifunctional amines (such as diethylene triamine) for a shelf-stable, one-component system. In EP 555,774, the system is stabilized by using vinyl acid polymerized with AAEM and the latex is "neutralized" with a polyamine. The patent teaches that the carboxyl groups should be 70 to 96 mol percent relative to the acetoacetoxy groups. WO 96/16998 similarly describes a polymerization process with the vinyl acid and AAEM being polymerized in the first stage.

EP 744,450 describes aqueous coating compositions containing acetoacetate functional polymers with a weight-averaged molecular weight of 100,000 or greater and which contain acetoacetate functional groups and acidic functional groups, and multifunctional amine.

EP 778,317 describes an aqueous self-crosslinkable polymeric dispersion comprising a polymeric component (a relatively hydrophobic polymer having a Hansch number>1.5, at least 5% of a carbonyl functional group capable of reacting with a nitrogen moiety, and at least 1 % of a non-acidic functional group having hydrogen-bondable moieties); and a crosslinking agent comprising a nitrogen-containing compound having at least two nitrogen functional groups capable of reacting with a carbonyl functional moiety. Again it is reported that no gellation has taken place after ten days at 60° C.

U.S. Pat. No. 5,498,659 discloses a single-package aqueous polymeric formulation consisting essentially of an evaporable aqueous carrier, at least one polymeric ingredient having acid-functional pendant moieties able to form stable enamine structures, a non-polymeric polyfunctional amine having at least two amine functional moieties, and an effective amount of base for inhibiting gellation. It is stated in the patent that at least some of the crosslinking of the composition may take place in the liquid phase, possibly within one to four hours of adding the non-polymeric polyfuctional amine. It is postulated that addition of base to the reactor contents competes with the amine-functional moieties vis-à-vis the acetoacetoxy-type functional moieties, thereby reducing the degree of crosslinking and/or enhancing the colloidal stability of the polymer dispersion which forms when the crosslinking reaction takes place.

Geurink, et al., "Analytical Aspects and Film Properties of Two-Pack Acetoacetate Functional Latexes", Progress in Organic Coatings 27 (1996) 73–78, report that crosslinking of acetoacetate functional latexes with polyamine compounds is very fast, and that this crosslinking is hardly hindered by existing enamines. It is further stated that there are very strong indications that crosslinking takes place rapidly in the wet state, in or at the surface of the particles just after mixing of the components. They conclude that as a result of crosslinking in the particles, the film forming process is hampered.

In the patents and articles described above, the usable pot life of the latex formulations is demonstrated by lack of gel formation. It is quite possible, however, that crosslinking is taking place within each particle, without causing the latex to coagulate or gel (e.g. loss of colloidal stability). This type of intraparticle crosslinking (before drying) limits the ability of the latex to form a film upon drying. This in turn reduces the film integrity and performance of the polymer. Therefore, a need still exists for truly latent crosslinking systems—those in which intraparticle crosslinking is inhibited until after film formation. In particular, a need exists for one-pack, latent crosslinking systems which are useful in a wide range of latex applications. These would include decorative and protective coatings, adhesives, non-woven binders, textiles, paper coatings, inks, etc. In each case, the advantage would be a soft, ductile polymer that converts to a harder, more resistant latex film after drying.

SUMMARY OF THE INVENTION

The present invention relates to latex polymer compositions containing a polymer component having amine-reactive carbonyl groups, a crosslinking component having carbonyl-reactive amine nitrogens capable of being protonated by an acid, and a volatile acid component.

The latex polymer compositions of the present invention exhibit latent crosslinking properties. Latent crosslinking in the polymers takes advantage of the fast reaction that occurs between amine reactive carbonyl groups in the polymer component and carbonyl reactive amine nitrogens in the crosslinking component, but controls the rate of crosslinking by protonating the amines with a volatile acid. Once the latex is coated onto a substrate, the volatile acid evaporates and the carbonyl reactive amine nitrogens react with the amine reactive carbonyl groups to form a crosslinked coating.

The invention further relates to a method of making a latent crosslinking polymer composition by polymerizing a vinyl monomer having amine-reactive carbonyl groups to form a polymer; adding a crosslinking agent having at least two carbonyl-reactive amine nitrogens capable of being protonated by an acid, and adding a volatile acid.

In another embodiment, the invention relates to a crosslinked coating of the polymer composition described above.

DETAILED DESCRIPTION

The present invention provides latex polymer compositions. The latex polymer compositions of the present invention typically include, but are not limited to, latexes, dispersions, microemulsions, or suspensions. The latex polymer compositions of the present invention may be stored at room temperature or moderately above room temperature (e.g., about 50 to 60° C.) and provide adhesion and crosslinking upon film formation when applied to a substrate. A film or coating formed with polymers of the present invention may be cured at room temperature (ambient cure) or at elevated temperatures (thermal cure).

The polymers used to prepare the waterborne polymer composition of the present invention are generally prepared as particles. The particles may be structured or unstructured. Structured particles include, but are not limited to, core/shell particles and gradient particles. The average polymer particle size may range from about 25 to about 600 nm.

The polymer particles generally have a spherical shape. In one embodiment, the generally spherical polymeric particle may have a core portion and a shell portion. The core/shell polymer particles may also be prepared in a multilobe form, a peanut shell, an acorn form, or a raspberry form. It is further preferred in such particles that the core portion comprises about 20 to about 80 of the total weight of said particle and the shell portion comprises about 80 to about 20 of the total weight volume of the particle.

Polymer Component

Polymers having repeating units of amine-reactive carbonyl groups represent a preferred type of polymer useful in the practice of the invention. Examples of amine-reactive carbonyl type functional groups include, but are not limited to, ketone- or aldehyde-functional ethylenically unsaturated monomers such as acetoacetyl type monomers, diacetone acrylamide, (meth)acryloxyalkyl benzophenone, (meth) acrolein, crotonaldehyde, 2-butanone(meth)acrylate, and the like, and mixtures thereof. A preferred class of amine reactive carbonyl groups are those having acetoacetyl functionality. Although other amine-reactive carbonyl type functional groups may be used, the following description will be limited to a discussion of acetoacetyl type functional polymers for simplicity. The term (meth)acrylate as used through the specification includes both acrylates and methacrylates.

Polymers having repeating units derived from acetoacetyl functional groups may be prepared by free radical emulsion polymerization of vinyl monomers having an acetoacetyl functionality, such as those of Formula (I) below, alone or with other vinyl monomers. This combination of monomers provides water-based dispersion of polymer particles where the polymer has pendant acetoacetyl groups. As used here, a "vinyl" monomer is an ethylenically unsaturated monomer. A pendant acetoacetyl group is not strictly limited to those at the termini of the polymer. Pendant acetoacetyl groups also include groups attached to the polymer's backbone and available for further reaction.

Acetoacetyl-type functional monomers may be represented as shown in Formula (I):

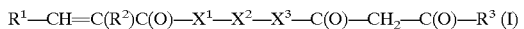

$$R^1—CH=C(R^2)C(O)—X^1—X^2—X^3—C(O)—CH_2—C(O)—R^3 \quad (I)$$

For an acetoacetyl-type monomer of Formula (1), $R^1$ is a hydrogen or halogen. $R^2$ is a hydrogen, halogen, $C_1$–$C_6$ alkylthio group, or $C_1$–$C_6$ alkyl group. $R^3$ is a $C_1$–$C_6$ alkyl group. $X^1$ and $X^3$ are independently O, S, or a group of the formula —N(R')—, where R' is a $C_1$–$C_6$ alkyl group. $X^2$ is a $C_2$–$C_{12}$ alkylene group or $C_3$–$C_{12}$ cycloalkylene group. The alkyl and alkylene groups described here and throughout the specification may be straight or branched groups. Preferred monomers of Formula (I) are acetoacetoxyethyl (meth)acrylate, acetoacetoxy(methyl)ethyl (meth)acrylate, acetoacetoxypropyl (meth)acrylate, allyl acetoacetate, acetoacetamidoethyl (meth)acrylate, acetoacetoxybutyl (meth)acrylate, acetoacetoxyethyl (meth)acrylamide, acetoacetamido (meth)acrylamide and mixtures thereof. Acetoacetoxyethyl methacrylate (AAEM) represents a particularly preferred monomer of Formula (I).

Suitable other vinyl monomers which may be reacted with the vinyl monomers having acetoacetyl-type functionality include, but are not limited to, methyl (meth)acrylate; ethyl (meth)acrylate; butyl (meth)acrylate; isobutyl (meth) acrylate; ethylhexyl (meth)acrylate; octyl (meth)acrylate; styrene; α-methyl styrene; glycidyl methacrylate; carbodiimide (meth)acrylate; $C_1$–$C_{18}$ alkyl crotonates; di-n-butyl maleate; dioctylmaleate; allyl (meth)acrylate; di-allyl maleate; di-allylmalonate; methoxybutenyl (meth)acrylate; isobornyl (meth)acrylate; hydroxybutenyl (meth)acrylate; hydroxyethyl (meth)acrylate; hydroxypropyl (meth) acrylate; acrylonitrile, vinyl chloride; ethylene; (meth) acrylamide; butyl (meth)acrylamide; ethyl (meth) acrylamide; vinyl (meth)acrylate; isopropenyl (meth) acrylate; cycloaliphatic epoxy (meth)acrylates; and ethylformamide. Such monomers are described in "The Brandon Worldwide Monomer Reference Guide and Sourcebook" Second Edition, 1992, Brandon Associates, Merrimack, N.H.; and in "Polymers and Monomers", the 1996–1997 Catalog from Polyscience, Inc., Warrington, Pa.

Vinyl esters of the general Formula (II) represent further examples of useful other vinyl monomers:

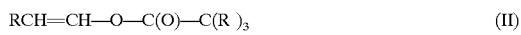
$$RCH=CH—O—C(O)—C(R)_3 \qquad (II)$$

In Formula (II), R is independently hydrogen or an alkyl group of up to 12 carbon atoms. Particular monomers of Formula (II) include $CH_2=CH—O—C(O)—CH_3$, $CH_2=CH—O—C(O)—C(CH_3)_3$, $CH_2=CH—O—C(O)—CH(C_2H_5)(C_4H_9)$, and $CH_2=CH—O—C(O)—CH_2CH_3$. Vinyl ester monomers also include vinyl esters of vinyl alcohol such as the VEOVA series available from Shell Chemical Company as VEOVA 5, VEOVA 9, VEOVA 10, and VEOVA 11 products. See O. W. Smith, M. J. Collins, P. S. Martin, and D. R. Bassett, Prog. Org. Coatings 22, 19 (1993).

Optional monomers that may be incorporated into the polymer include butyl styrene, vinyl toluene, (meth) acrylonitrile, vinyl acetate, and vinyl esters of acids other than acetic acid, itaconic anhydride, maleic anhydride, vinyl formate, and salts of 2-sulfoethyl (meth)acrylate.

In one embodiment, the acetoacetyl functional polymer may also incorporate nitrogen-containing, vinyl monomers known to promote wet adhesion. Exemplary wet adhesion monomers include, for example, t-butylaminoethyl methacrylate; dimethylaminoethyl methacrylate; diethylaminoethyl methacrylate; N,N-dimethylaminopropyl methacrylamide; 2-t-butylaminoethyl methacrylate; N,N-dimethylaminoethyl acrylate; N-(2-methacrylamido-ethyl) ethylene urea; and N-(2-methacryloyloxyethyl)ethylene urea. N-(2-methacryloyloxyethyl)ethylene urea is available from RohmTech as 50% solution in water under the Rohamere 6852-O trade name and as a 25% solution in water under the Rohamere 6844 trade name. N-(2-methacrylamidoethyl)ethylene urea is available from Rhone-Poulenc under the WAM trade name.

Small amounts of acid vinyl monomers may also be used to prepare acetoacetoxy emulsion polymers according to the invention. Such acid vinyl monomers include, for example, acrylic acid, methacrylic acid, crotonic acid, itaconic acid, tiglic acid, maleic acid, fumaric acid, and 2-acrylamido-2-methyl-1-propanesulfonic acid (sodium, potassium, or ammonium salts). Generally these monomers are used in small amounts. Preferably, the amount of acid vinyl monomers may range, for example, from 0 to 5 phr. Larger amounts of acid vinyl monomers may be used to achieve a desired effect, such as increased viscosity.

Acetoacetyl type functional polymers preferably contain about 0.5 to about 99.5 weight percent of vinyl monomers having acetoacetyl-type functionality such as those of Formula I, and about 99.5 to about 0.05 weight percent of other vinyl monomers, preferably alkyl (meth)acrylates having 1 to 18 carbons. Acetoacetyl functional polymers are also useful as 100 percent of the polymer composition. The weight percentage is based on the total amount of monomers in the composition. More preferably, the acetoacetyl functional polymer has about 10 to about 50 weight percent acetoacetyl monomers, and about 90 to about 50 weight percent of other vinyl monomers.

Acetoacetyl functional polymers of the present invention may be prepared using emulsion polymerization techniques known in the art. The acetoacetyl polymer may be prepared using free radical emulsion polymerization techniques which yield structured or unstructured particles. As mentioned above, structured particles include, for example, core/shell particles, raspberry particles, and gradient particles. Chain transfer agents, initiators, reducing agents, catalysts, and surfactants known in the art of emulsion polymerization, may be used to prepare the polymers.

Chain transfer agents may optionally be added, in an amount up to about 5 weight percent based on total monomer content, to control the molecular weight of the polymer. Use of chain transfer agents may be preferred when it is desired to obtain low molecular weight polymers. Exemplary chain transfer agents are butyl mercaptan, mercaptopropionic acid, 2-ethylhexyl mercaptopropionate, dodecylmercaptan, n-butyl mercaptopropionate, octyl mercaptan, isodecyl mercaptan, octadecyl mercaptan, mercaptoacetic acid, allyl mercaptopropionate, allyl mercaptoacetate, crotyl mercaptopropionate, crotyl mercaptoacetate, and the reactive chain transfer agents taught in U.S. Pat. No. No. 5,247,040, incorporated here by reference.

Typical initiators include hydrogen peroxide, sodium, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Polymerization catalysts are those compounds which increase the rate of polymerization and which, in combination with the above described reducing agents, may promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof. Peroxide-iron and peroxide-sulfite redox catalysts may also be used.

Crosslinking agents may optionally be added, in an amount up to about 2 weight percent, based on total monomer content, to control the molecular weight of the polymer. Use of crosslinking agents may be preferred when it is desired to obtain high molecular weight polymers. Useful crosslinkers include trimethylolpropane tri(meth)acrylate, 1,6-hexanediol di(meth)acrylate, allyl methacrylate and the like.

Any conventional polymerization surfactant may be used to form the polymers of the present invention. Useful surfactants include, but are not limited to, ionic and nonionic surfactants such as alkyl polyglycol ethers; alkyl phenol polyglycol ethers; alkali metal or ammonium salts of alkyl, aryl or alkylaryl sulfonates, sulfates, acids of complex organic phosphate esters, phosphates, and the like, and reactive anionic or nonionic surfactants possessing styrene or allyl groups. Sulfonate containing surfactants such as sodium dodecyl diphenyloxide disulfonate, sodium dodecyl benzene sulfonate, sodium dodecyl sulfate, or the diesters of sodiosulfosuccinic acid such as sodium dioctylsulfosuccinate, and alpha olefin sulfonates, and the like, are suitable. When persulfate catalysts are used, in-situ-generated oligomers with sulfate end groups may also act as surfactants.

The type and amount of surfactant used in the polymerization process depends on the specific composition, reaction conditions, and the desired final particle size, as is known in the art.

Water-dispersible and water-soluble polymers may also be employed as surfactants/stabilizers in the water-based latexes of the invention. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; alkali-soluble acrylic resins as described in U.S. Pat. No. 4,839,413; and hydroxyethyl cellulose, as described in U.S. Pat. No. 3,876,596 and British Patent 1,155,275.

Crosslinking Component

The crosslinking component in the present invention may be any nitrogen-containing compound having at least two carbonyl group-reactive amine nitrogens. Such compounds may be aliphatic or aromatic, polymeric or non-polymeric, and may be used alone or in combination. Carbonyl reactive amines useful in the practice of the invention include polyfunctional amines, hydrazine, alkyl dihydrazines, alkylene dioxime ethers and dihydrazides of dicarboxylic acids. Preferably, the carbonyl-reactive amines are polyfunctional amines having at least two primary amine groups capable of being protonated by an acid. Preferred amines include, but are not limited to, ethylenediamine, propylenediamine, tetramethylenediamine, pentamethylenediamine, hexamethylenediamine, diethylenetriamine, triethylenetetramine, tetraethylenepentamine, pentaethylenehexamine, polyethyleneimine, polypropyleneimine, ethylene or propylene oxide adducts (e.g. triethyleneglycol diamine or JEFFAMINES®), cyclohexane diamine, xylylene diamine, aminotrimethylcyclohexane amine, 2,2,4-trimethylhexane diamine, 2,2-dimethylpropane diamine, triaminononane, triaminoethylamine, diaminoethanolamine, diaminomethylcyclohexane, and mixtures thereof.

Volatile Acid Component

Volatile acids useful in the practice of the present invention may be defined as organic acids having a boiling point of less than 250° C. Useful volatile acids include carboxylic acids, such as formic, acetic, propionic, butanoic, pentanoic, hexanoic, heptanoic, octanoic, and their respective isomers; cyclohexanoic and benzoic; carbonic acid; carbonate and bicarbonate salts such as ammonium or sodium carbonate or bicarbonate; and mixtures thereof. Carbonic acid may be provided in the form of a gas, solid (e.g. Dry Ice) or salt that evolves carbon dioxide gas. Preferred volatile acids are carbonic acid (carbon dioxide) and acetic acid.

Method of Making a Latent Crosslinking Polymer

The order of mixing of the above-described components of the latex polymer composition may vary. In some cases, it may be easier to mix the acetoacetyl functional latex polymer with a volatile acid component prior to addition of the crosslinking amine. In other cases, such as when using $CO_2$, the amine and $CO_2$ may be mixed first to form an amine salt and then added to the acetoacetyl functional latex polymer. The addition of the acid or the acid salt of the amine may, in some cases, cause coagulation or gelling of the latex. In those cases, additional stability may be provided by adding surfactants, preferably nonionic surfactants, or stabilizing monomers, preferably acrylamide. Stabilization using acrylamide monomers is believed to be due to the formation of a water-soluble polymer layer around the latex particles which enhances stability.

The level of acetoacetoxy functional polymer in the latex polymer composition may range from about 0.5 to 100%. The amount of carbonyl reactive amine is typically present at about 0.5 to about 1.5 molar equivalent to the acetoacetoxy groups present in the polymer. The level of volatile acid should be sufficient to protonate a significant fraction of the amines, and is typically present at about 0.25 to about 1.5 equivalents to the amine level.

The latex polymer compositions of the present invention may vary in properties, depending on the end-use application. In general, the polymer component may have a second cycle glass transition temperature (Tg) of −50 to +100° C.; more preferably, −20 to +50° C. However, the final crosslinked latex polymer composition may have a Tg of up to about 150° C.

The weight average molecular weight of the latex polymer compositions may vary from about 5,000 to 5,000,000 daltons; more preferably from 20,000 to 2,000,000 and most preferably from 50,000 to 1,000,000. The molecular weight range may be controlled by reaction conditions, as is known in the art, or by the use of a chain transfer agent or crosslinkers, as discussed above. Since the polymers of the present invention become highly crosslinked upon drying, there is no substantial disadvantage to starting with very low molecular weight polymers. Low molecular weight polymers may offer advantages in film formation and polymer chain interdiffusion.

The method of making a latent crosslinking polymer using the method of the present invention, may have applicability to other chemistries which are crosslinked using amines. These type systems include, but are not limited to, epoxies (glycidyl methacrylate), silanes, isocyanates, and other carbonyls.

A waterborne polymer composition may be prepared using the latex polymer composition of the present invention along with other known additives and may use other emulsion polymerization methodology. U.S. Pat. No. 5,371,148 provides a good description of possible additives and is incorporated herein by reference.

The examples below illustrate the preparation of latex polymers and waterborne polymer compositions according to the invention.

Latexes or other waterborne compositions containing small particle size polymers, those ranging from about 25 to about 700 nm, preferably from about 50 to about 500 nm and more preferably from about 75 to about 300 nm, represent one preferred embodiment of the invention.

The polymers and waterborne polymer compositions of the invention are useful in a variety of coating formulations such as architectural coatings, metal coatings, wood coatings, plastic coatings, textile coatings, cementitious coatings, paper coatings, inks, and adhesives. Examples of such coating formulations adapted for particular uses include, but are not limited to, corrosion inhibitors, concrete coatings, maintenance coatings, latex paints, industrial coatings, automotive coatings, textile backcoatings, surface printing inks and laminating inks. Accordingly, the present invention relates to such coating formulations containing a waterborne polymer composition of the invention, preferably a water-based latex. The polymers and waterborne polymer compositions of the invention may be incorporated in those coating formulations in the same manner as known polymer latexes and used with the conventional components and or additives of such compositions. The coating formulations may be clear or pigmented. With their crosslinking ability, adhesion properties, and resistance properties, the water-based latexes of the invention impart new and/or improved properties to the various coating formulations.

Upon formulation, a coating formulation containing a latex polymer or waterborne polymer composition of the invention may then be applied to a variety of surfaces, substrates, or articles, e.g., paper, plastic, steel, aluminum, wood, gypsum board, concrete, brick, masonry, or galvanized sheeting (either primed or unprimed). The type of surface, substrate, or article to be coated generally determines the type of coating formulation used. The coating formulation may be applied using means known in the art. For example, a coating formulation may be applied by spraying or by coating a substrate. In general, the coating may be dried by heating but preferably is allowed to air dry. Advantageously, a coating employing a polymer of the invention may be thermally or ambiently cured. As a further aspect, the present invention relates to a shaped or formed article which has been coated with coating formulations of the present invention.

A waterborne polymer composition according to the invention may further comprise water, along with a solvent, a pigment (organic or inorganic) and/or other additives and fillers known in the art, and enumerated below. When a solvent is used, water-miscible solvents are preferred. A latex paint composition of the invention may comprise a waterborne polymer composition of the invention, a pigment and one or more additives or fillers used in latex paints.

Additives or fillers used in formulating coatings include, but are not limited to, leveling, rheology, and flow control agents such as silicones, fluorocarbons, urethanes, or cellulosics; extenders; curing agents such as multifunctional isocyanates, multifunctional carbonates, multifunctional epoxides, or multifunctional acrylates; reactive coalescing aids such as those described in U.S. Pat. No. 5,349,026; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; drying agents; catalysts; crosslinking agents; or coalescing agents. Specific examples of such additives can be found in *Raw Materials Index*, published by the National Paint & Coatings Association, 1500 Rhode Island Avenue, NW, Washington, D.C. 20005.

A polymer or waterborne polymer composition of the present invention can be utilized alone or in conjunction with other conventional waterborne polymers. Such polymers include, but are not limited to, water dispersible polymers such as consisting of polyesters, polyester-amides, cellulose esters, alkyds, polyurethanes, epoxy resins, polyamides, acrylics, vinyl polymers, polymers having pendant allyl groups such as described in U.S. Pat. No. 5,539,073, styrene-butadiene polymers, vinylacetateethylene copolymers, and the like.

The following examples are intended to illustrate, not limit, the invention:

EXAMPLES

Test Methods

MEK Rubs

An aluminum test panel was coated with latex to give a 1 mil dry film. Multiple layers of cheesecloth are secured over the round head of a 16-oz ball pin hammer. The hammer is attached to a mechanical device, which moves the hammer back and forth when in operation. The machine is equipped with a counter. The cheesecloth is saturated with methylethylketone (MEK), and each panel is rubbed with the soaked cloth until the film is removed from the center portion of the substrate. The values reported are the number of "double rubs" or passes back and forth across the film.

Pendulum Hardness

A glass test panel was coated with latex to give a 2–3 mil dry film. The hardness of each sample was measured using a Gardner Pendulum Hardness Tester. The sample is placed under the pendulum of the instrument. The pendulum rocks back and forth. The pendulum motion is dampened by the film. The harder the film, the longer the pendulum swings. The values reported are the number of pendulum swings.

Glass Transition Temperature (Tg)

Glass transition temperatures (Tg's) were measured using a DuPont 2200 differential scanning calorimeter with a heating rate of 20° C./min. The value reported is the midpoint Tg.

Water Absorbance

Samples were prepared by casting a 4 mil wet film on a pre-weighed aluminum panel. The films were then dried and re-weighed to determine the dry weight of polymer. The plates were submerged in water for twenty-four hours, then wiped dry and re-weighed. The weight gained after soaking divided by the dry weight of polymer provided the percent weight gain.

Film Gel Fraction (FGF) and Film Swell Ratio (FSR)

Dried film was removed from a glass panel with a razor blade, weighed (original film weight ~0.5 g), and placed in a 200 ml glass jar. The jar was filled with tetrahydrofuran (THF) (~100 g), then placed on a shaker for ~24 hours. After 24 hours, the THF/film was filtered through a pre-weighed piece of 100 mesh metal wire screen. The mesh wire containing the wet film was folded over and shaken to remove all excess THF. The mesh wire/film was then immediately weighed (wet film weight). The mesh wire/film was placed in a forced air 80° C. oven for 6 hours to dry. Once dried, the samples were removed, allowed to cool to room temperature, and the mesh wire/film was weighed (dry film weight). "Swell index" was calculated by the following equation: (wet film weight−screen)/(dry film weight−screen weight). "% Gel" was calculated by the following equation: (dry film weight−screen weight)/original film weight×100.

Tukon Hardness

A glass test panel was coated with latex to give a 2–3 mil dry film. The hardness of each sample was measured using a Wilson® Tukone Series 200 instrument. Hardness is determined by the size of an indentation made by a probe pressing on the film under a fixed load. The values reported are in units of knoops.

Resistance Minimum Film Forming Temperature

Resistance minimum film forming temperature (MFFT resist) is determined by casting a wet latex film with a 1-mil applicator cube on an MFFT bar set at a temperature range in which the film will coalesce during drying, pulling the edge of a brass spatula blade through the film from cold to hot end on the MFFT bar after 30 minutes, and recording the temperature at which the film offers significant resistance to the spatula.

Surfactants

Tergitol® 15-S-40 surfactant, available from Union Carbide, is a C11–C15 secondary alcohol ethoxylate with an HLB of 18.0. Rhodoface RE610 surfactant, available from Rhone-Poulenc, is an acid of a complex organic phosphate ester. Dowfax® 2A1 surfactant, available from Dow Chemical, is a sodium dodecyl diphenyloxide disulfonate. Igepal® C0887 surfactant, available from Rhone-Poulenc, is a nonylphenol ethoxylate with an HLB of 17.2.

Polyester Seed Latex

The water dispersible polyester resin containing a sulfonate group used in the latex synthesis examples is described in U.S. Pat. No. 4,946,932, incorporated herein by reference.

Carbonate Salt Synthesis

Carbonate salts of the multifunctional amines were prepared by adding excess solid carbon dioxide (Dry Ice) to 25% aqueous solutions of the amines with stirring until no further carbon dioxide was consumed (i.e., constant weight). For example, 50.0 g of triethyleneglycol diamine was dissolved in 150 g de-ionized water. Dry Ice was added with stirring over a one hour period, resulting in a total weight gain of 11.5 g and a pH of 8.6.

Example 1

Latex Synthesis

Into a 2-liter, 3-necked, glass reactor equipped with an agitator, a reflux condenser and a nitrogen inlet was charged a solution consisting of 616.6 g de-ionized water and 12.8 g of a 33% polyester dispersion in water. An aqueous solution was prepared containing 4.2 g of ammonium persulfate and 28.2 g of surfactant (a 15% solution of the ammonium salt of Rhodafac® RE-610) in 73.9 g of de-ionized water. A monomer mixture was prepared containing 275.3 g butyl acrylate, 262.6 g methyl methacrylate, 296.5 g acetoacetoxyethyl methacrylate, and 4.2 g 2-ethylhexyl-3-mercaptopropionate. An aqueous monomer mixture was made containing 25.4 g of 50% aqueous acrylamide in 200.1 g of de-ionized water.

After the reactor charge was heated to 82° C. under a nitrogen atmosphere, the aqueous and monomer mixtures were pumped into the reactor. The aqueous solution was added at a rate of 0.39 g/min for 270 min. The monomer mixture was added at a rate 0.93 g/min for 45 min then 3.49 g/min for 225 min. The aqueous acrylamide mixture was added at a rate of 0.25 g/min for 45 min then 0.95 g/min for 225 minutes. After completion of the feeds, the reactor was held at 82° C. for one hour, then cooled to room temperature. The product was a latex polymer having a pH of 2.6, a solids content of 46.8%, a particle size of 95 nm, and a glass transition temperature (Tg) of 20.1° C.

Example 2

Fifty gram portions of the above latexes were formulated with 2.0 g of Tergitol® 15-S-40 surfactant (35% active), then with acids and amines as shown in Table 1.

TABLE 1

| | Amounts of Acid and Polyfunctional Amine | | | | | |
|---|---|---|---|---|---|---|
| Ref # | Volatile Aci | Conc. | Amt (g) | Amine | Conc. | Amt (g) |
| 1 (Comparative) | None | | | | | |
| 2C* | None | | | EDA** | 30% | 3.8 |
| 3 | EDA/CO$_2$ | 30% | 6.3 | | | |
| 4 | Acetic Acid | 30% | 7.8 | EDA | 30% | 3.8 |
| 5 | Acetic Acid | 30% | 3.9 | EDA | 30% | 3.8 |
| 6 | Ammonium Bicarbonate | 100% | 1.5 | EDA | 30% | 3.8 |

*Control
**Ethylene diamine.

In samples #2–6, the ethylene diamine (EDA) was one equivalent to the AAEM. In samples 3, 4, and 6, the acid is one equivalent to the amine. In sample 5, the acid is 0.5 equivalent to the amine.

Table 2 shows that samples 3–6 have better dry film properties than comparative #1, including higher Tg, lower swell index, and greater hardness. This indicates extensive crosslinking. Samples 3–6 also have much lower film formation temperature than Control #2. This suggests that the crosslinking of #2 occurs undesirably in the wet state (before film formation), while the crosslinking of 3–6 occurs after film formation.

TABLE 2

| | | Minimum Film Formation Temperature in ° C. | | | | | | Tukon Hardness versus Cure Time | | | Pendulum Hardness versus Cure Time | | |
|---|---|---|---|---|---|---|---|---|---|---|---|---|---|
| Ref # | Tg** | MFFT 1 Day | MFFT 3 Days | MFFT 6 Days | MFFT 15 Days | Swell Index*** | % Gel*** | 2 Hr | 24 Hr | 1 Wk | 2 Hr | 24 Hr | 1 Wk |
| 1 (Comparative) | 9 | 0 | 1 | 0 | 3 | 50 | 1 | <0.6 | <0.6 | <0.6 | 7 | 7 | 8 |
| 2C* | 50 | 29 | 37 | 38 | 43 | 4.2 | 93 | **** | | | **** | | |
| 3 | 57 | 5 | 7 | 8 | 10 | 5.1 | 91 | 1.0 | 4.8 | 11.4 | 18 | 37 | 67 |
| 4 | 56 | 6 | 6 | 3 | 5 | 3.9 | 91 | 0.9 | 6.2 | 11.0 | 20 | 56 | 73 |
| 5 | 57 | 10 | 9 | 9 | 12 | 4.3 | 92 | 2.3 | 7.5 | 10.3 | 29 | 51 | 71 |
| 6 | 56 | 13 | 13 | 15 | 18 | 4.5 | 91 | 1.3 | 5.4 | 8.0 | 23 | 38 | 42 |

*Control
**Tg measured by DSC after drying at 22° C. for one week
***Solvent Swell Index and Percent Gel in THF films, dried at 22° C., 24 hrs. before testing
****Sample #2 Control did not form a film

Example 3

Latex Synthesis

Into a 2-liter, 3-necked, glass reactor equipped with an agitator, a reflux condenser and a nitrogen inlet was charged a solution consisting of 533 g de-ionized water and 7.7 g of a 33% polyester dispersion in water. An aqueous solution was prepared containing 4.6 g of ammonium persulfate and 30.8 g of surfactant (a 15% solution of the ammonium salt of Rhodafac® RE610) in 68.3 g of de-ionized water. A monomer mixture was prepared containing 300.4 g butyl acrylate, 286.6 g methyl methacrylate, and 323.6 g acetoacetoxyethyl methacrylate. An aqueous monomer mixture was made containing 27.7 g of 50% aqueous acrylamide in 217.2 g of de-ionized water.

After the reactor charge was heated to 82° C. under a nitrogen atmosphere, the aqueous and monomer mixtures were pumped into the reactor. The aqueous solution was added at a rate of 0.38 g/min for 270 min. The monomer mixture was added at a rate 1.01 g/min for 45 min then 3.84 g/min for 225 min. The aqueous acrylamide mixture was added at a rate of 0.27 g/min for 45 min then 1.03 g/min for 225 minutes. After completion of the feeds, the reactor was held at 82° C. for one hour, then cooled to room temperature. The product was a latex polymer having a pH of 2.7, a solids content of 50.8%, a particle size of 167 nm, and a glass transition temperature (Tg) of 22.2° C.

Example 4

Fifty gram portions of the above latex were formulated with 1.4 g of Tergitol® 15-S-40 surfactant (35% solution in water), then with acids and amines as shown in Table 3.

TABLE 3

Amounts of Amine Salts Added

| Ref # | Component | Conc. | Amount (g) |
|---|---|---|---|
| 7 (Comparative) | None | — | — |
| 8 | Triethyleneglycol Diamine/CO2 | 30% | 13.3 |
| 9 | Hexamethylene Diamine/CO2 | 30% | 11.1 |
| 10 | Ethylene Diamine/CO2 | 30% | 7.2 |

In samples 8–10, the amine is one equivalent to the AAEM. Again, excellent film properties are achieved for samples 8–10, using three different amines as shown in Table 4.

TABLE 4

Film Properties (Films cured 82° C. for one hour.)

| Ref # | Tg (° C.) | Tukon | Pendulum | Swell Index | Water Absorbance* (% wt gain) |
|---|---|---|---|---|---|
| 7 (Comparative) | 14 | <0.2 | 11 | 11.8 | 31 |
| 8 | 50 | 10.7 | 104 | 3.0 | 17 |
| 9 | 54 | 10.8 | 107 | 2.1 | 14 |
| 10 | 64 | 13.0 | 110 | 2.8 | 12 |

*Soaked 24 hours in water.

Example 5

Latex synthesis:

Into a 2-liter, 3-necked, glass reactor equipped with an agitator, a reflux condenser and a nitrogen inlet was charged a solution consisting of 860.1 g de-ionized water and 12.5 g of a 33% polyester dispersion in water. An aqueous solution was prepared containing 4.1 g of sodium persulfate, 1.7 g of sodium bicarbonate and 18.4 g of surfactant (a 45% solution of Dowfax® 2A1) in 75.4 g of de-ionized water. A monomer mixture was prepared containing 413.9 g butyl acrylate, 393.2 g methyl methacrylate, and 20.7 g acetoacetoxyethyl methacrylate. An aqueous monomer mixture was made containing 25.4 g of 50% aqueous acrylamide in 200.1 g of de-ionized water.

After the reactor charge was heated to 82° C. under a nitrogen atmosphere, the aqueous and monomer mixtures were pumped into the reactor. The aqueous solution was added at a rate of 0.37 g/min for 270 min. The monomer mixture was added at a rate 0.92 g/min for 45 min then 3.49 g/min for 225 min. After completion of the feeds, the reactor was held at 82° C. for one hour, then cooled to room temperature. The product was a latex polymer having a pH of 6.8, a solids content of 46.7%, a particle size of 110 nm, and a glass transition temperature (Tg) of 17.6° C.

Example 6

Fifty gram portions of the above latex were formulated with 3.9 g of Igepal® CO887 surfactant (30% active), then with acids and amines as shown in Table 5.

TABLE 5

Amounts of Amine Salts Added

| Ref # | Component | Conc. | Amount (g) |
|---|---|---|---|
| 11 (Comparative) | None | — | — |
| 12 | Triethyleneglycol Diamine/CO2 | 30% | 0.87 |
| 13 | Ethylene Diamine/CO2 | 30% | 0.47 |

In samples 12 and 13, the amine is one equivalent to the AAEM.

Even at low AAEM levels, a significant difference is still seen in swell index and percent gel, with minimal effect on Tg. Normally it is expected to see a 1 to 1.5° C. rise in Tg for each 1 wt. % AAEM in the latex.

TABLE 6

Film Properties*

| Ref # | Swell Index | Percent Gel | Tg (° C.) |
|---|---|---|---|
| 11 C | 46.4 | 66 | 10 |
| 12 | 6.8 | 92 | 11 |
| 13 | 6.8 | 92 | 16 |

*Samples were dried at 22° C. for 3 days.

Example 7

Latex synthesis

Into a 2-liter, 3-necked, glass reactor equipped with an agitator, a reflux condenser and a nitrogen inlet was charged a solution consisting of 865.1 g de-ionized water and 12.6 g of a 33% polyester dispersion in water. An aqueous solution was prepared containing 4.1 g of sodium persulfate, 1.7 g of sodium bicarbonate and 9.2 g of surfactant (a 45% solution of Dowfax® 2A1) in 75.4 g of de-ionized water. The monomer feed contained 831.9 g acetoacetoxyethyl methacrylate.

After the reactor charge was heated to 82° C. under a nitrogen atmosphere, the aqueous and monomer mixtures were pumped into the reactor. The aqueous solution was added at a rate of 0.33 g/min for 270 min. The monomer feed was added at a rate 0.92 g/min for 45 min then 3.51 g/min for 225 min. After completion of the feeds, the reactor was held at 82° C. for one hour, then cooled to room temperature. The product was a latex polymer having a pH of 4.5, a solids content of 44.4%, a particle size of 290 nm, and a glass transition temperature (Tg) of 3.2° C.

Example 8

Fifty gram portions of the above latex were formulated with 3.7 g of Igepal® C0887 surfactant (30% active), then with acids and amines as shown in Table 7.

TABLE 7

Amounts of Amine Salts Added

| Ref # | Component | Conc. | Amount (g) |
|---|---|---|---|
| 14 (Comparative) | None | — | — |
| 15 | Triethyleneglycol Diamine/CO2 | 30% | 33.2 |
| 16 | Ethylene Diamine/CO2 | 30% | 18.0 |

In samples 15 and 16, the amine is one equivalent to the AAEM.

At this high level of AAEM, there is a significant increase in Tg after crosslinking, as shown in Table 8.

TABLE 8

Film Properties*

| Ref # | Tg (° C.) | Tukon | Pendulum | Swell Index | Percent Gel |
|---|---|---|---|---|---|
| 14 (Comparative) | −3.5 | <0.6 | 2 | 49 | 17 |
| 15 | 115 | 5.2 | 47 | 2.9 | 87 |
| 16 | 120 | 9.9 | 73 | 3.1 | 90 |

*Samples were dried at 22° C. for 3 days.

Example 9

Latex synthesis

Into a 2-liter, 3-necked, glass reactor equipped with an agitator, a reflux condenser and a nitrogen inlet was charged a solution consisting of 574.7 g de-ionized water and 7.4 g of a 33% polyester dispersion in water. An aqueous solution was prepared containing 4.4 g of ammonium persulfate, 1.59 g of 28% ammonium hydroxide and 29.6 g of surfactant (a 15% solution of the ammonium salt of Rhodafac® RE610) in 71.1 g of de-ionized water. A monomer mixture was prepared containing 288.9 g butyl acrylate, 253.3 g methyl methacrylate, 311.1 g acetoacetoxyethyl methacrylate, and 22.2 g methacrylic acid. An aqueous monomer mixture was made containing 26.7 g of 50% aqueous acrylamide in 208.9 g of de-ionized water.

After the reactor charge was heated to 82° C. under a nitrogen atmosphere, the aqueous and monomer mixtures were pumped into the reactor. The aqueous solution was added at a rate of 0.40 g/min for 270 min. The monomer mixture was added at a rate 0.97 g/min for 45 min then 3.70 g/min for 225 min. The aqueous acrylamide mixture was added at a rate of 0.26 g/min for 45 min then 0.99 g/min for 225 minutes. After completion of the feeds, the reactor was held at 82° C. for one hour, then cooled to room temperature. The product was a latex polymer having a pH of 4.9, a solids content of 48.6%, a particle size of 171 nm, and a glass transition temperature (Tg) of 25.9° C.

Example 10

Fifty gram portions of the above latex were formulated with acids and amines as shown in Table 9.

TABLE 9

Amounts of Amine Salts Added

| Ref # | Component | Conc. | Amount (g) |
|---|---|---|---|
| 17 (Comparative) | None | — | — |
| 18 C* | Triethyleneglycol Diamine | 30% | 9.8 |
| 19 | Triethyleneglycol Diamine/CO2 | 30% | 12.7 |
| 20 C* | Ethylene Diamine | 30% | 4.0 |
| 21 | Ethylene Diamine/CO2 | 30% | 6.9 |

*Control

In samples 18–21, the amine is one equivalent to the AAEM.

Samples 19 and 21 form films at much lower temperatures than control samples 18 and 20. Sample 19 also has much better film properties than comparative sample 17.

TABLE 10

| | Film Formation Temperature of Aged Samples | | | | Film Properties** | | | |
|---|---|---|---|---|---|---|---|---|
| Ref # | 3.5 Hrs | 44 Hrs | 170 Hrs | Tg | Tukon Hardness | Pendulum Hardness | MEK Rubs | Swell Index |
| 17 (Comparative) | 5 | 5 | 6 | 21 | <0.6 | 21 | 39 | 12.0 |
| 18 C* | 35 | 39 | 42 | *** | | | | |
| 19 | 10 | 14 | 19 | 50 | 12.0 | 112 | 109 | 2.6 |
| 20 C* | 47 | 55 | 59 | | | | | |
| 21 | 10 | 15 | 21 | | | | | |

*Control
**Films were cured at 82° C. for one hour before testing.
***Did not form a film at room temperature.

What is claimed is:

1. A latex polymer composition comprising:
   a. vinyl polymer component wherein said polymer component comprising polymers having repeating units of amine-reactive carbonyl groups;
   b. crosslinking component comprising nitrogen containing compounds having at least two carbonyl group-reactive amine nitrogens capable of being protonated by component c; and
   c. volatile acid component comprising an organic acid having a boiling point of less than 250° C.

2. The latex polymer composition of claim 1 wherein said amine-reactive carbonyl groups comprise functional groups selected from the group consisting of acetoacetyl monomers, diacetone acrylamide, (meth)acryloxyalkyl benzophenone, (meth)acrolein, crotonaldehyde, 2-butanone(meth)acrylate, and mixtures thereof.

3. The latex polymer composition of claim 2 wherein said amine-reactive carbonyl groups comprise acetoacetyl monomers.

4. The latex polymer composition of claim 3 wherein said acetoacetyl monomers are selected from the group consisting of acetoacetoxyethyl (meth)acrylate, acetoacetoxy (methyl)ethyl (meth)acrylate, acetoacetoxypropyl (meth)acrylate, allyl acetoacetate, acetoacetamidoethyl (meth)acrylate, acetoacetoxybutyl (meth)acrylate, acetoacetoxyethyl (meth)acrylamide, acetoacetamidoethyl (meth)acrylamide, and mixtures thereof.

5. The latex polymer composition of claim 4 wherein said amine-reactive carbonyl groups are present in an amount from about 0.5 to 100 weight percent of the polymer based on the total amount of monomers present in the polymer.

6. The latex polymer composition of claim 1 wherein said repeating units of amine reactive carbonyl groups are present in an amount of from about 0.5 to 99.5 weight percent of the polymer component a.

7. The latex polymer composition of claim 1 wherein said polymer component further comprises other vinyl monomers.

8. The latex polymer composition of claim 7 wherein said other vinyl monomers comprises alkyl (meth)acrylates.

9. The latex polymer composition of claim 7 wherein said other vinyl monomers are present in an amount from about 99.5 to 0.5 weight percent based on the total amount of monomers present in the polymer.

10. The latex polymer composition of claim 1 wherein said crosslinking component is selected from the group consisting of ethylenediamine, propylenediamine, tetramethylenediamine, pentamethylenediamine, hexamethylenediamine, diethylenetriamine, triethylenetetramine, tetraethylenepentamine, pentaethylenehexamine, polyethyleneimine, polypropyleneimine, ethylene oxide amine adducts, propylene oxide adducts, cyclohexane diamine, xylylene diamine, aminotrimethylcyclohexane amine, 2,2,4trimethylhexane diamine, 2,2-dimethylpropane diamine, triaminononane, triaminoethylamine, diaminoethanolamine, diaminomethylcyclohexane, and mixtures thereof.

11. The latex polymer composition of claim 1 wherein said volatile acid component is selected from the group consisting of formic acid, acetic acid, propionic acid, butanoic acid, pentanoic acid, hexanoic acid, heptanoic acid, octanoic acid and their respective isomers; cyclohexanoic acid, benzoic acid; carbonic acid; and mixtures thereof.

12. A waterborne polymer composition comprising
   a. a latex polymer wherein said latex polymer comprises:
      a. polymer component comprising polymers having repeating units of amine-reactive carbonyl groups;
      b. crosslinking component comprising nitrogen containing compounds having at least two carbonyl-reactive amine nitrogens capable of being protonated by an acid; and
      c. volatile acid component comprising an organic acid having a boiling point of less than 250° C.; and
   b. water.

13. A method of making a latent crosslinking polymer composition comprising adding to a polymer component comprising polymers having repeating units of amine-reactive carbonyl groups, a crosslinking component comprising nitrogen containing compounds having at least two carbonyl-reactive amine nitrogens capable of being protonated by an acid and a volatile acid component comprising an organic acid having a boiling point of less than 250° C.

14. A crosslinked coating comprising a polymer component comprising polymers having repeating units of amine-reactive carbonyl groups, a crosslink component comprising nitrogen containing compounds having at least two carbonyl-reactive amine nitrogens capable of being protonated by an acid, and a volatile acid component comprising an organic acid having a boiling point of less than 250° C.

15. The crosslinked coating of claim 14 wherein said polymer component has repeating units of amine-reactive carbonyl groups; said crosslinking component comprises nitrogen containing compounds having at least two carbonyl-reactive amine nitrogens capable of being protonated by an acid; and said volatile acid component comprises an organic acid having a boiling point of less than 250° C.

* * * * *